C. E. P. JULIEN.
DISTRIBUTOR FOR SOWING MACHINES.
APPLICATION FILED FEB. 25, 1919.
1,409,009.
Patented Mar. 7, 1922.
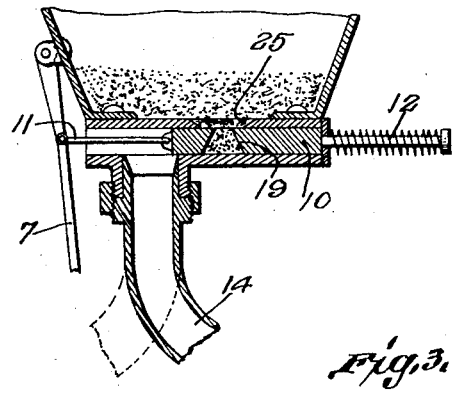
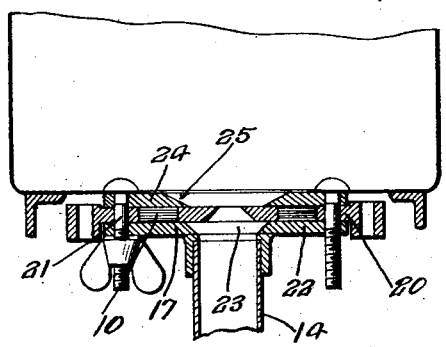
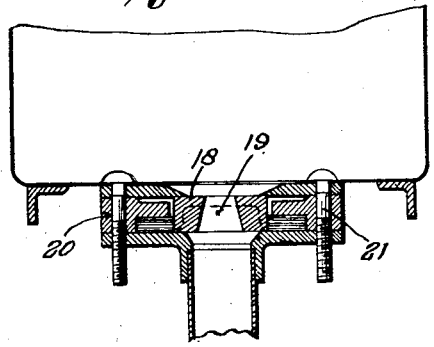
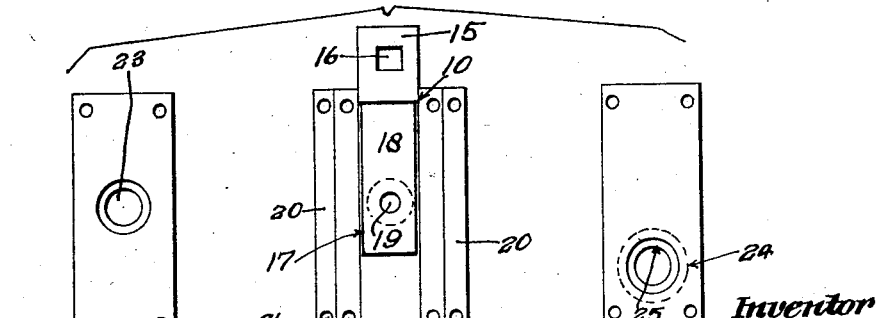
Inventor
CYPRIEN E. P. JULIEN
BY
ATTORNEYS

UNITED STATES PATENT OFFICE.

CYPRIEN EDOUARD PAUL JULIEN, OF PARIS, FRANCE.

DISTRIBUTOR FOR SOWING MACHINES.

1,409,009.   Specification of Letters Patent.   Patented Mar. 7, 1922.

Application filed February 25, 1919. Serial No. 279,040½.

*To all whom it may concern:*

Be it known that I, CYPRIEN EDOUARD PAUL JULIEN, a citizen of the French Republic, and residing in Paris, France, 41 Boulevard Haussmann, have invented certain new and useful Improvements in and Relating to Distributors for Sowing Machines, (for which I have filed an application in France, December 20, 1916,) of which the following is a complete specification.

This invention relates to a sliding distributor for sowing machines for all kinds of seed or manure, in continuous or discontinuous lines, and in variable amounts. It is more particularly characterized by a distributing plate, having a frusto-conical aperture controlled by a frame sliding between two other fixed plates which are also provided with frusto-conical apertures, in order to bring successively the aperture of the sliding plate in alinement with those of the fixed plates, and thus effect the distributing of seed or other substances, in quantity determined by the capacity of the aperture of the sliding plate.

In the accompanying drawing which represents by way of example a constructional form of the invention:

Figure 1 is a longitudinal axial section of the sliding distributor, mounted on a hopper, showing a means of operating the sliding valve.

Figures 2 and 3 are cross sections on a larger scale of the distributor in its housing for two different capacities of distribution.

Figure 4 shows the parts of the distributor.

On the bottom of the hopper 5, which contains the substances to be distributed is provided a plate 24 with a frusto-conical aperture 25 corresponding to a frusto conical aperture 19 provided in a sliding valve 10 controlled by a convenient controlling organ, for instance a rod 11 connected to a lever 7.

The sliding valve comprises a sliding frame provided with a protruding part 15 having a hole 16. That frame has, in its central part, a housing 17 for a distributing plate 18 provided with a frusto-conical aperture 19. The frame is guided between two reglets 20 (Figures 2 and 3) held by bolts 21, the head of which rests on the plate 24 solid with the bottom of the hopper. The winged-nuts of those bolts maintain a plate 22 provided with a frusto-conical aperture 23 and with a pipe 14 leading to the ground the substance to be distributed.

As shown by Figures 2 and 3, each of the reglets 20 possesses several sizes of thickness, in order to permit the use of a single reglet for two or several thicknesses of sliding plates 18, that is to say for different volumes of the distributing aperture 19.

As clearly shown by those Figures 2 and 3, the small base of the truncated cone 19 is opposite to the small base of the truncated cone 25, the large base of 19 being opposite to the large base 23.

The operation is the following:

The slide valve being placed at the bottom of the hopper, the seed arrives through the aperture 25 (Figures 1 and 4) of that hopper into the aperture 19 which, being drawn by the sliding frame, allows those seed to fall into the aperture 23 of the lower plate 22, from where they are led to the ground, either freely or by the tube 14.

The frame may be controlled by a lever, by toothed wheels, or any other means.

The quantities of seed or other substance may be regulated by the capacity of the aperture 19, which depends at the same time on the thickness of the plate 18, and of the diameters of the bases of the truncated cone; then it is sufficient to vary the thickness of the plate 18 together with that of the reglets 20, as shown in Figures 4 and 5, to obtain any capacity of the aperture 19 suitable to the substance to be distributed.

What I claim is:

1. In a seed drilling or sowing machine, distributing means including an upper distributing plate adapted to constitute the bottom of a hopper, a lower distributing plate, said plates having frusto-conical apertures, spacing reglets of variant thickness laterally, and a frusto-conically apertured slide valve mounted between said upper and lower distributing plates.

2. In a seed drilling or sowing machine in combination a seed hopper, a bottom plate therefor, said plate having a frusto-conical aperture therethrough, a second plate spaced from the bottom plate, and reglets or spacers interposed between said plates at their outer edges, said reglets consisting of a perforated relatively thick portion, and a relatively thin flange projecting therefrom, whereby by alternating the position of said reglets the space between the spaced plates may be regulated to accommodate slide valves of varying thickness, said plates having frusto-conical apertures therethrough, and a slide valve mounted to slide between said plates, said valve having also a frusto-conical aperture, but disposed as to its bases reversely to those of the aforesaid plates.

In testimony whereof I have hereunto set my hand at Paris (France), this 6th day of February, 1919.

CYPRIEN EDOUARD PAUL JULIEN.

In presence of—
JOHN F. SIMONS.